United States Patent [19]

Thiele et al.

[11] Patent Number: 5,544,559

[45] Date of Patent: Aug. 13, 1996

[54] WORKPIECE ABUTMENT FOR MACHINE TOOLS

[75] Inventors: Siegfried Thiele, Minden; Jürgen Sensmeier, Löhne, both of Germany

[73] Assignee: Wilhelm Altendorf GmbH & Co. KG, Minden, Germany

[21] Appl. No.: 238,918

[22] Filed: May 6, 1994

[30] Foreign Application Priority Data

May 14, 1993 [DE] Germany .............................. 9307328 U

[51] Int. Cl.⁶ ....................................................... B26D 7/01
[52] U.S. Cl. ....................... 83/43.8; 83/468.7; 83/522.19; 269/319; 269/320
[58] Field of Search ..................................... 269/319, 318, 269/315, 320, 297, 301; 83/468.7, 467.1, 468.4, 419, 391, 522.19, 522.25, 522.21, 466.1, 823, 829, 438

[56] References Cited

U.S. PATENT DOCUMENTS

| 637,214 | 11/1899 | Pangborn ................... 269/319 |
| 2,618,300 | 11/1952 | Freudenthaler ............ 269/318 |
| 3,162,220 | 12/1964 | Raab et al. ................. 269/301 |
| 3,163,065 | 12/1964 | Kolodgy et al. ........... 269/320 |
| 3,994,484 | 11/1976 | Schorr . |
| 4,577,538 | 3/1986 | Hirata et al. ............... 269/319 |
| 4,600,184 | 7/1986 | Ashworth . |
| 4,782,871 | 11/1988 | Aigner ....................... 269/315 |
| 5,092,058 | 3/1992 | Luttmer et al. ............ 83/522.19 |
| 5,228,374 | 7/1993 | Santeramo, Sr. ........... 83/522.19 |
| 5,327,653 | 7/1994 | Pistorius et al. ........... 83/522.25 |

FOREIGN PATENT DOCUMENTS

| 0236814 | 9/1987 | European Pat. Off. . |
| 8033824 U | 5/1981 | Germany . |
| 9114150 U | 2/1992 | Germany . |
| 9202908 U | 6/1992 | Germany . |
| 361659 | 6/1962 | Switzerland . |
| 470946 | 5/1969 | Switzerland . |
| 602274 | 7/1978 | Switzerland . |
| 605024 | 9/1978 | Switzerland . |
| 2135630 | 9/1984 | United Kingdom . |
| WO91/00162 | 1/1991 | WIPO . |
| WO93/07983 | 4/1993 | WIPO . |

*Primary Examiner*—Eugenia Jones
*Assistant Examiner*—Charles Goodman
*Attorney, Agent, or Firm*—Schweitzer Cornman & Gross

[57] ABSTRACT

An adjustable stop mechanism for limiting the movement of a rip fence toward the cutting plane of a tiltable panel saw as an automatic function of the selected orientation of an abutment bar. The abutment bar has first and second orientations alternately presenting an abutment face of relatively low height, located at a greater distance from a reference surface, and a relatively greater height, located at a relatively shorter distance from the reference surface. When the abutment bar is rotated to the low height orientation, as to accommodate tilting of the panel saw blade, a limit stop position of movement of the abutment bar toward the cutting plane is automatically altered, so that the limit stop for the abutment bar support is farther away from the cutting plane. When the bar is oriented to present a full height abutment face, the limit stop automatically is altered in response to such orientation, to permit the support to move closer to the cutting plane.

5 Claims, 4 Drawing Sheets

WORKPIECE ABUTMENT FOR MACHINE TOOLS

BACKGROUND AND SUMMARY OF THE INVENTION

The invention relates to a workpiece abutment for machine tools, especially a rigs fence stop for panel saws having a tilting saw blade, comprising an abutment bar disposed parallel to a tool plane, which can be detachably fixed to a support, which can be moved transversally to the tool plane on and fixed to the machine frame. The abutment bar can be oriented in one of two positions swivelled by 90° in relation to one another around the longitudinal axis of the bar, whereby in a first position the abutment bar presents an abutment face of lesser height to the tool and in a second position presents an abutment face of greater height in comparison thereto to said tool. A stop on the machine frame interacts with a counter-stop on the support to limit the approach of the support to the tool.

By means of so-called abutment, workpieces are positioned on machine tools, such as panel saws, so that precise machining can be performed. With some panel saws the saw blade can be tilted so that longitudinal cuts can be performed at a certain angle.

With such cuts the blanks to be machined are brought to abut the so-called rip or parallel fence, the distance of which from the tool plane can be varied. If abutment bars are used, which make available abutment faces of varying heights depending on the position, so that it is possible to cut narrow workpieces even with a tilting saw blade, there is the difficulty of limiting the approach of the support with the abutment bars of varying widths at varying distances of the support from the tool in order to prevent contact between the abutment bar and the tool in each position of the abutment bar and to guarantee a minimum distance of the abutment bar of 2 mm for example to the tool.

The object of the invention is to provide a workpiece abutment of the type mentioned at the beginning in which the approach of the support and thus of the abutment bar to the tool in both positions of the abutment bar is limited in a particularly safe and simple manner.

The problem is solved in accordance with the invention in that on the machine frame are disposed two stops at different distances from the tool and which interact with a counter-stop adjusted to one of the stops in dependence on the position of the abutment bar.

In this manner in each position of the abutment bar on the machine frame the stop which is automatically activated is that which ensures that the approach of the abutment bar to the tool is limited to the minimum distance.

In a particularly advantageous embodiment of the invention the counter-stop consists of a part movably mounted on the support, which in the first position of the abutment bar assumes a first position in which it is adjusted to interact with the stop farther from the tool, while in the second position of the abutment bar it assumes a second position in which it interacts with the other stop, which is a shorter distance from the tool. The advantage lies in the particularly simple construction of the counter-stop in the form of a part movably mounted on the support.

In a purely mechanical refinement of the invention two of the lateral faces of the abutment bar comprise T-shaped grooves for the attachment of the abutment bar to the support. The counter-stop is an eccentrically mounted bar freely rotating around a horizontal axis, which in the second position of the abutment bar on account of gravity dips partially into one of the T-shaped grooves so that it can travel past the farther stop to the stop disposed laterally staggered in relation thereto. In the first position of the abutment bar this eccentric bar is swivelled into its first position, in which it interacts with the farther stop.

According to an alternative embodiment of the invention, the counter-stop can be moved by means of an electric motor to activate one of the stops by controlling the electric motor by signals of an electro-mechanical sensor, which provides signals varying in accordance with the position of the abutment bar.

Particularly great operating comfort is achieved with an embodiment in which an electronic measurement and display unit determines the relative position of the support in relation to the machine frame and the value of the distance of the stop face from the tool is displayed, and in which an electro-mechanical sensor provides different signals according to the respective position of the abutment bar and supplies them to the measurement and display unit. With a change in the position of the abutment bar, the actual distance of the abutment face from the tool is therefore automatically indicated.

The stops on the machine frame can be advantageously moved so that they can be exactly adjusted in each individual case.

A preferred exemplified embodiment of the present invention is described below with reference to the attached drawings.

DETAILED DESCRIPTION OF THE INVENTION

Figure 1:
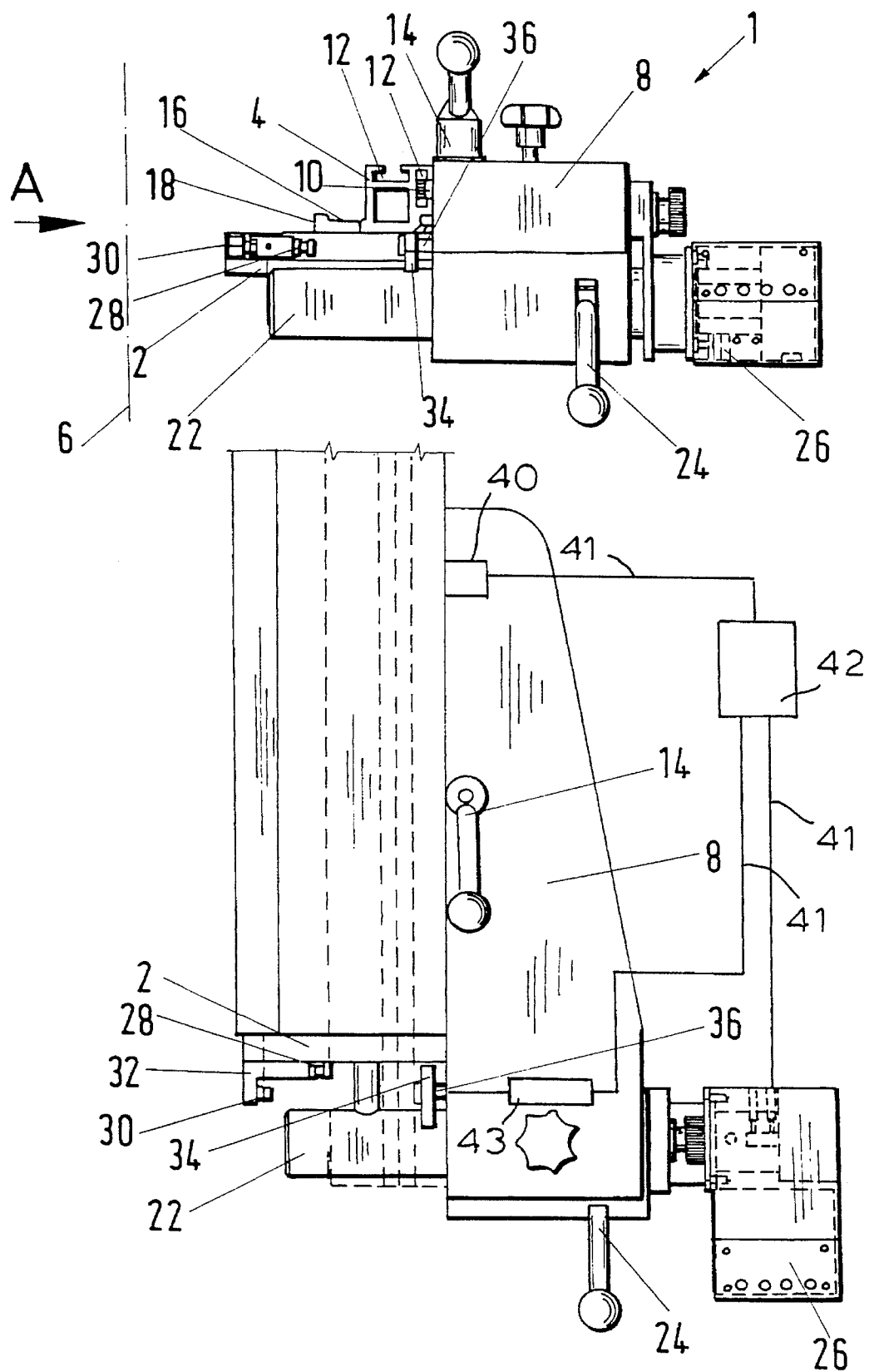
FIG. 1 shows a rigs fence of a panel saw having an abutment bar attached to a support in a first position and a counter-stop rotatably mounted on the support, in side view and in plan view.
Figure 2:
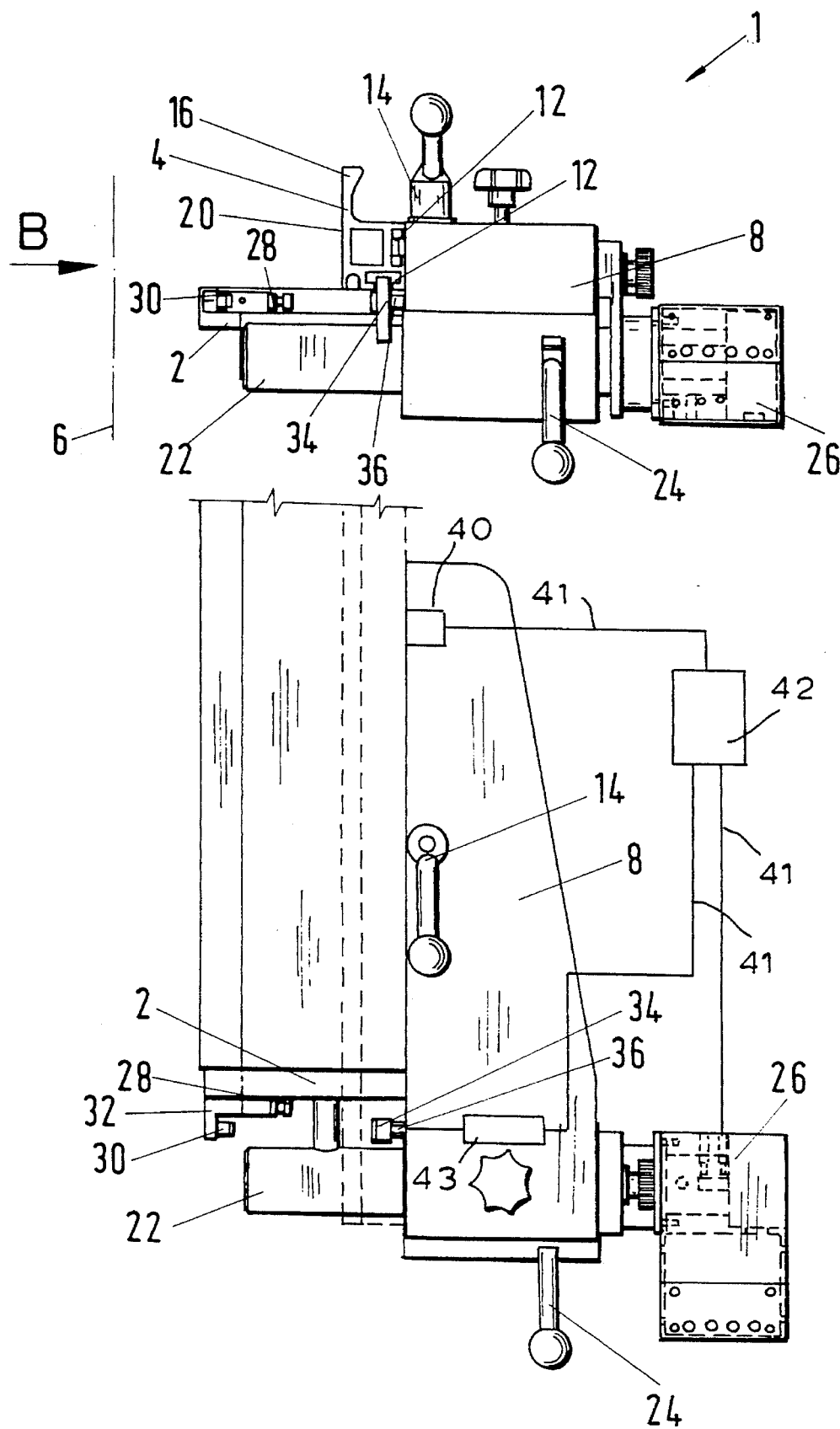
FIG. 2 shows the rigs fence from FIG. 1, in which the abutment bar is attached to the support in a second position, in side view and plan view.
Figure 3:
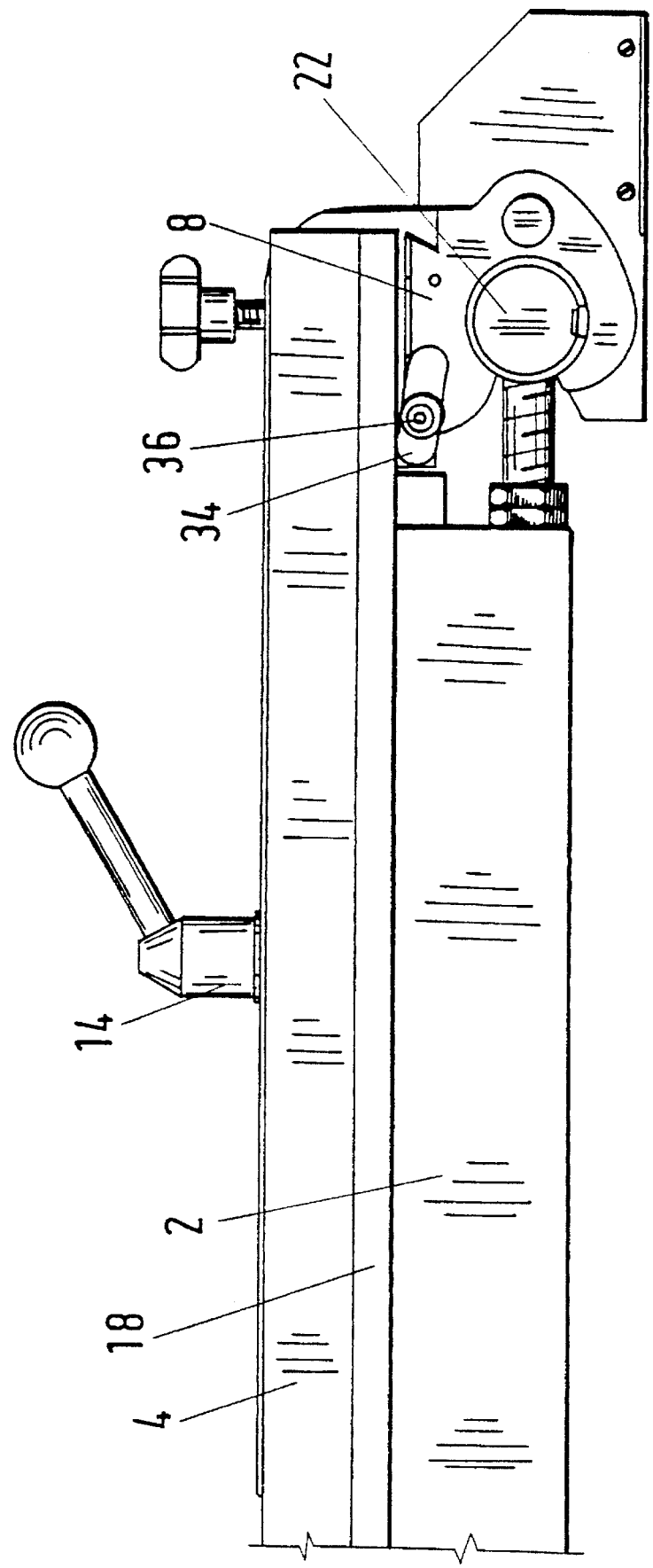
FIG. 3 shows a side view of the rigs fence characterised by A in FIG. 1.
Figure 4:
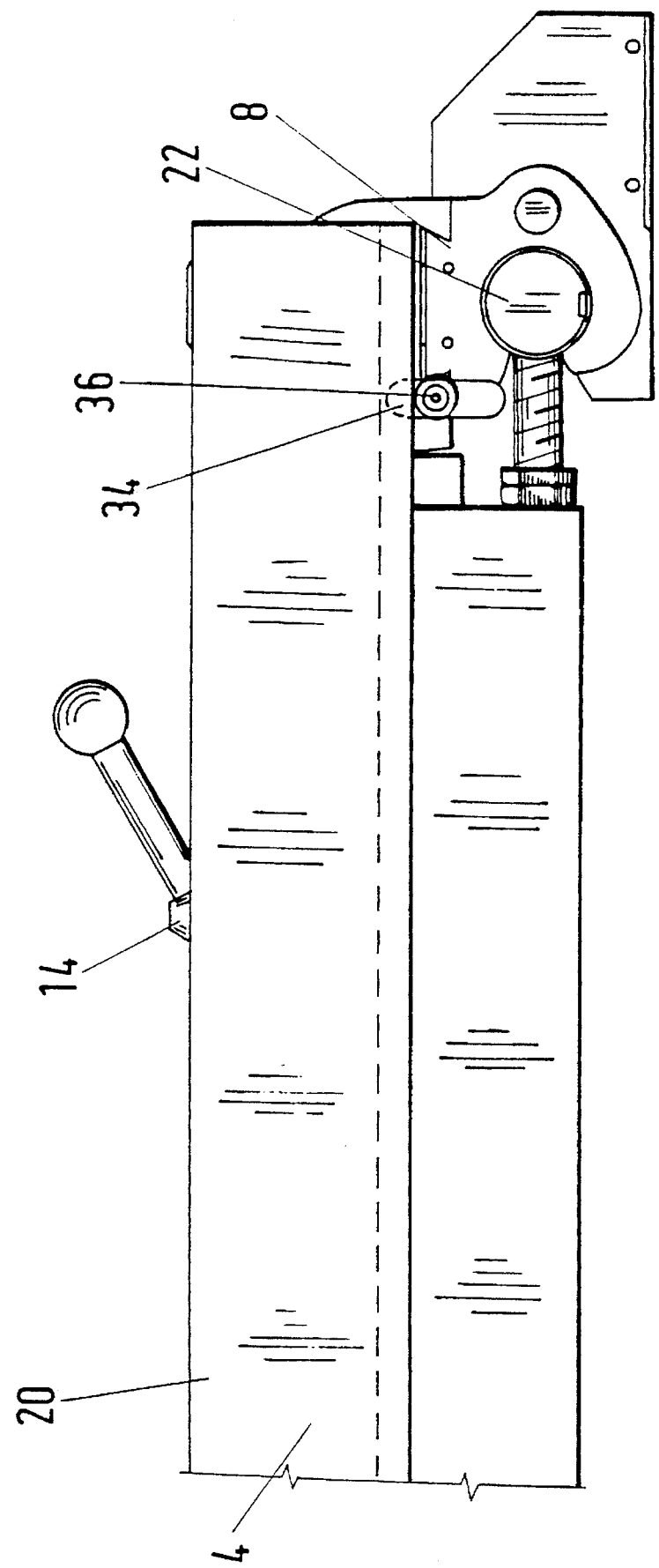
FIG. 4 shows a side view of the rigs fence characterised by B in FIG. 2.

The stop represented in FIGS. 1 to 4 is a rip or parallel fence of a panel saw, which comprises a tilting saw blade (not shown), which partly protrudes from a gap between a machine frame 2 and a rolling truck (not shown). An abutment bar 4 is disposed parallel to a tool plane 6, which is defined by the saw blade in its non-tilted position. The abutment bar designed as a hollow section lies on the plane upper side of the machine frame 2 and is attached to a support 8. The bar 4 is brought up to the support 8 by at least one pulling bolt 10, mounted horizontally on the support 8, which with its bolt head engages with a T-shaped groove 12. The pulling bolt 10 can be pretensioned or loosened by means of a clamping device 14.

On two of its lateral faces the abutment bar 4 comprises T-shaped grooves 12, which can be used to attach the abutment bar 4 to the support 8. The abutment bar 4 consists of a profile having a substantially square cross section, to which a flat projection 16 is added as an extension of a side face.

In FIG. 1 the abutment bar 4 is attached to the support in a first position, in which the projection 16 lies on the machine frame 2 and in which an abutment face 18 of lesser height is turned towards the tool. The height of this abutment face 18 corresponds to the width of the projection 16 at its free end. A can be seen from FIG. 2, the abutment bar 4 can be attached to the support 8 in a second position swivelled by 90° around the longitudinal axis of the bar, in which second position the abutment bar 4 presents an abutment face 20 of greater height in comparison with abutment face 18 to the tool. In this exemplified embodiment the height of the abutment face close to the tool in the first position of the abutment bar is roughly 15 mm, the distance of this abutment face from the support is 94 mm, the height of the abutment face in the second position is also 94 mm and the distance of this abutment face from the support is 51.5 mm. The difference between the distance of the abutment face from the support in the first position of the abutment bar and the same distance in the second position is therefore 42.5 mm.

The support 8 is mounted on the machine frame 2 for movement at right angles to the tool plane by the fact that it encloses a rod 22 rigidly connected to the machine frame 2. By using a clamping means 24 the support 8 can be fixed in the desired position on the rod 22. The support 8 is attached to an electronic measurement and display unit 26, with which the relative position of the support 8 in relation to the rod 22 is determined, for example by means of a magnetically coded measuring tape mounted along the rod and a sensor which can move with the support 8, and the value of the distance of the abutment face 18, 20 from the tool is indicated. The measurement and display unit 26 could alternatively be immovably mounted on a part of the machine frame 2.

On the machine frame 2 a first abutment 28 and a second stop 30 are attached in a horizontal plane to a rest 32 comprising two arms disposed at right angles to one another. The first stop 28 is disposed at a greater distance from the tool than the second stop 30. Both abutments are adjustable, i.e. the respective distance from the tool can be altered by the stops consisting of a threaded bolt which is screwed in an internal thread provided in the rest 32 and it being locked by means of a check nut. Stops 28 and 30 are used to limit the approach of the support 8 and thus of the abutment bar 4 when the support 8 travels towards the tool, in which a part of the support 8 interacts with one of the stops 28 or 30.

A movable bar 34, acting as a counter-stop to stop 28 and 30, is mounted on support 8 in freely rotatable manner around a horizontal axis. The oblong bar 34 is provided with an off-centre bore, through which a part of a bolt 36 mounted on support 8 passes. One of the two stops 28 and 30 interacts with the counter-stop on the support 8 in dependence on the position of abutment bar 4. In the first position of the abutment bar the freely rotatable bar 34 assumes a first position, in which it is adjusted so that it interacts with the first stop 28 further away from the tool, while in the second position of the abutment bar 4 the counter stop assumes a second position, in which it interacts with the second stop 30 disposed closer to the tool. In the present exemplified embodiment this is achieved in that the eccentrically mounted and freely rotatable bar 34 rotates by the effect of gravity into a substantially vertical orientation if the abutment bar 4 is mounted in the second position on the supports, because the bar 34 can partially dip into one of the T-shaped grooves 12. In this vertical orientation of the bar 34 during a displacement of the support 8 towards the tool this bar passes the first stop 28 and eventually then comes into contact with the second stop 30, which is disposed laterally staggered in relation to the first stop 28.

If the bar 4 is attached in the first position to the support 8, the bar 34 is not aligned with a groove in the abutment bar 4 and thus is swivelled away by the abutment bar 4 and thus interacts with the first stop 28 so that with the movement of the support 8 towards the tool it comes to a stop at a greater distance from the tool.

According to an embodiment of the present invention which is not illustrated, an electro-mechanical sensor 40, for example in the form of a mechanical key in conjunction with an electric switch, can produce a signal to determine the set position of the abutment bar 4, which is supplied via lines 41 to an electronic control mechanism 42, which in turn performs the control of an electric motor 43, in order to activate either the first or second stop in dependence on the position of the abutment bar 4 by a bar mounted as a counter-stop on support 8 being moved, which is coupled to the shaft of the electric motor.

According to a further embodiment the signals from the sensor 40 (which also can be electro-magnetic) characterising the position of the abutment bar 4 can be supplied to the electronic measurement and display unit 26. From said unit taking into consideration the change in the distance of abutment faces 18 and 20 with an alteration of the position of abutment bar 4, the actual distance value of the activated abutment face from the tool can be indicated, as the difference between the distance of abutment face 18 from support 8 and the distance of abutment face 20 from the support is known and can be stored in the measurement and display unit 26

We claim:

1. An adjustable stop mechanism for limiting the movement of a rip fence toward a cutting plane of a panel saw, wherein the rip fence includes a support mounted on a machine frame and movable toward and away from the cutting plane and defining a support reference, a selectively oriented abutment bar mounted on said support and having a first rotational orientation presenting a first abutment face of relatively low height, located at a relatively greater distance from said support reference, and a second rotational orientation presenting a second abutment face of relative greater height located at a relatively lesser distance from said support reference, the improvement characterized by (a) stop means alternatively operative between first and second stop conditions, for controllably limiting movement of said support in a direction toward said cutting plane, (b) said stop means including a stop member mounted on said support and first and second abutment stop elements mounted on said machine frame between said cutting plane and said support for selective cooperation with said stop member to limit movement of said support in a direction toward said cutting plane, (c) said stop member being movable between first and second positions in response to first and second rotational orientations of said abutment bar, (d) said stop member being engageable alternatively with said first and second abutment stop elements when said stop member is in said first and second positions, respectively, (e) said stop member and said stop elements cooperating to automatically block movement of said support in a direction toward said cutting plane at a position spaced farther from said cutting plane when said abutment bar is in said first rotational orientation than when said abutment bar is in said second rotational orientation.

2. An adjustable stop mechanism according to claim 1, wherein (a) said abutment stop elements are mounted for adjustable positioning in relation to said cutting plane.

3. An adjustable stop mechanism for limiting the movement of a rip fence toward a cutting plane of a panel saw, wherein the rip fence includes a support mounted on a machine frame and movable toward and away from the cutting plane and defining a support reference, a selectively oriented abutment bar mounted on said support and having a first orientation presenting a first abutment face of relatively low height, located at a relatively greater distance from said support reference, and a second orientation presenting a second stop face of relative greater height located at a relatively lesser distance from said support reference, the improvement characterized by (a) stop means, including a stop member carried by said support and being selectively operative between first and second stop conditions, for controllably limiting movement of said support in a direction toward said cutting plane, (b) said stop means being operably associated with said abutment bar whereby when said abutment bar is mounted in said first orientation said stop means is set in said first condition and when said abutment bar is mounted in said second orientation said stop means is set in said second condition, (c) said support reference being stopped farther from said cutting plane when said stop means is in said first condition than when said stop means is in said second condition, (d) said stop means including first and second abutment stop elements mounted on said machine frame for selective cooperation with said stop member, (e) said stop member and said abutment stop elements being relatively movable with respect to each other in accordance with orientations of said abutment bar, whereby said stop member selectively cooperates with a predetermined one of said abutment stop elements as a function of the orientation of said abutment bar, (f) said abutment bar being formed with T-shaped channels on two surfaces for mounting of said abutment bar to said support in two rotational orientations, (g) said abutment stop elements being mounted in fixed relation to said cutting plane, and (h) said stop member being movably mounted on said support and being partially received in one of said channels in one of said rotational orientations of said abutment bar, and (i) said stop member when partially received in said one channel, being cooperative with one of said abutment stop elements and, when not partially received in said one channel, being cooperative with the other of said abutment stop elements.

4. An adjustable stop mechanism for limiting the movement of a rip fence toward a cutting plane of a panel saw, wherein the rip fence includes a support mounted on a machine frame and movable toward and away from the cutting plane and defining a support reference, a selectively oriented abutment bar mounted on said support and having a first orientation presenting a first abutment face of relatively low height, located at a relatively greater distance from said support reference, and a second orientation presenting a second abutment face of relative greater height located at a relatively lesser distance from said support reference, the improvement characterized by (a) stop means, including a stop member carried by said support and being selectively operative between first and second stop conditions, for controllably limiting movement of said support in a direction toward said cutting plane, (b) said stop means being operably associated with said abutment bar whereby when said abutment bar is mounted in said first orientation said stop means is set in said first condition and when said abutment bar is mounted in said second orientation said stop means is set in said second condition, (c) said support reference being stopped farther from said cutting plane when said stop means is in said first condition than when stop means is in said second condition, (d) said stop means including first and second abutment stop elements mounted on said machine frame for selective cooperation with said stop member, and (e) said stop member and said abutment stop elements being relatively movable with respect to each other in accordance with orientations of said abutment bar, whereby said stop member selectively cooperates with a predetermined one of said abutment stop elements as a function of the orientation of said abutment bar, (f) said stop member comprising a stop bar movably mounted on said support, (g) said abutment stop elements being mounted in fixed relation to said cutting plane, (h) said stop bar being movable between first and second positions in response to first and second orientations of said abutment bar, (i) said stop bar being engageable alternatively with said first and second abutment stop elements when said stop bar is in said first and second positions, respectively, (j) sensor means for detecting the rotational orientation of said abutment bar, and (k) electric motor means responsive to said sensor means for moving said stop bar between said first and second positions thereof.

5. An adjustable stop mechanism for limiting the movement of a rip fence toward a cutting plane of a panel saw, wherein the rip fence includes a support mounted on a machine frame and movable toward and away from the cutting plane and defining a support reference, a selectively oriented abutment bar mounted on said support and having a first orientation presenting a first abutment face of relatively low height, located at a relatively greater distance from said support reference, and a second orientation presenting a second abutment face of relative greater height located at a relatively lesser distance from said support reference, the improvement characterized by (a) stop means, including a stop member carried by said support and being selectively operative between first and second stop conditions, for controllably limiting movement of said support in a direction toward said cutting plane, (b) said stop means being operably associated with said abutment bar whereby when said abutment bar is mounted in said first orientation said stop means is set in said first condition and when said abutment bar is mounted in said second orientation said stop means is set in said second condition, (c) said support reference being stopped farther from said cutting plane when said stop means is in said first condition than when stop means is in said second condition, (d) said stop means including first and second abutment stop elements mounted on said machine frame for selective cooperation with said stop member, (e) said stop member and said abutment stop elements are relatively movable with respect to each other in accordance with orientations of said abutment bar, whereby said stop member selectively cooperates with a predetermined one of said abutment stop elements as a function of the orientation of said abutment bar, (f) said stop member comprises a stop bar movably mounted on said support, (g) said abutment stop elements are mounted in fixed relation to said cutting plane, (h) said stop bar being moved between first and second positions in response to first and second orientations of said abutment bar, (i) said stop bar being engageable alternatively with said first and second abutment stop elements when said stop bar is in said first and second positions, respectively, (j) an electronic measurement and display unit is provided for display of the distance between said cutting plane and the presented abutment face of said abutment bar, and (k) sensor means are provided for detecting the rotational orientation of said abutment bar and correspondingly adjusting the display of said measurement and display unit in accordance with the spacing of said presented abutment face from said support reference.

* * * * *